United States Patent
Chino et al.

(10) Patent No.: US 6,206,154 B1
(45) Date of Patent: Mar. 27, 2001

(54) AXLE PIVOTING CONTROLLER AND HYDRAULIC CYLINDER FOR INDUSTRIAL VEHICLES

(75) Inventors: Kenji Chino; Masaya Hyodo, both of Kariya; Takayuki Muto; Teruyuki Shioya, both of Gifu-ken, all of (JP)

(73) Assignees: Kabushiki Kaisha Toyoda Jidoshokki Seisakusho, Kariya; Kayaba Kogyo Kabushiki Kaisha, Tokyo, both of (JP)

( * ) Notice: Subject to any disclaimer, the term of this patent is extended or adjusted under 35 U.S.C. 154(b) by 0 days.

(21) Appl. No.: 09/120,417

(22) Filed: Jul. 22, 1998

(30) Foreign Application Priority Data

Jul. 23, 1997 (JP) .................................................. 9-197205

(51) Int. Cl.$^7$ ........................................................ F16F 9/00
(52) U.S. Cl. ........................ 188/318; 188/314; 280/755; 280/754; 280/5.51
(58) Field of Search ................................. 188/300, 314, 188/318, 319.1, 282.2; 267/64.28, 64.12; 280/754, 755, 5.508, 5.51, 124.159, 124.161, 124.112

(56) References Cited

U.S. PATENT DOCUMENTS

| | | | |
|---|---|---|---|
| 2,756,989 | * | 7/1956 | Peras ..................................... 188/318 |
| 3,726,368 | * | 4/1973 | Taylor ................................... 188/316 |
| 4,580,797 | * | 4/1986 | Ericsson ............................ 280/5.508 |
| 4,655,440 | * | 4/1987 | Eckert ................................... 188/314 |
| 4,703,683 | * | 11/1987 | Sue ........................................ 188/67 |
| 4,810,849 | * | 3/1989 | Heideman ............................ 188/285 |
| 4,828,080 | * | 5/1989 | Locher .............................. 267/64.12 |
| 4,936,423 | | 6/1990 | Karnopp ............................... 188/299 |
| 4,986,393 | * | 1/1991 | Preukschat et al. .................. 188/318 |
| 5,452,883 | * | 9/1995 | Holson et al. ..................... 267/64.28 |
| 5,495,923 | * | 3/1996 | Bruski et al. ......................... 188/268 |
| 5,549,281 | * | 8/1996 | Hall ...................................... 267/119 |
| 5,639,119 | * | 6/1997 | Plate et al. ............................ 280/754 |
| 5,702,091 | * | 12/1997 | Perrin et al. ....................... 267/64.12 |
| 5,813,697 | * | 9/1998 | Bargenquast et al. ............... 280/754 |

FOREIGN PATENT DOCUMENTS

| | | |
|---|---|---|
| 42 35 264 | 4/1994 | (DE) . |
| 0454474A1 | * 10/1991 | (EP) . |
| 0 454 474 | 10/1991 | (EP) . |
| 2 681 563 | 3/1993 | (FR) . |
| 1 238 243 | 7/1971 | (GB) . |
| 54-108641 | 3/1981 | (JP) . |
| 58-183307 | 10/1983 | (JP) . |
| 58-214406 | 12/1983 | (JP) . |
| 6-191251 | 7/1994 | (JP) . |
| 1135298 | * 7/1997 | (JP) . |

* cited by examiner

Primary Examiner—Robert Oberleitner
Assistant Examiner—Devon Kramer
(74) Attorney, Agent, or Firm—Woodcock Washburn Kurtz Mackiewicz & Norris LLP

(57) ABSTRACT

A hydraulic apparatus is used in an industrial vehicle. The apparatus has a hydraulic cylinder interposed between a vehicle frame and an axle swingably coupled to the frame. A passage connects a first chamber with a second chamber defined by a piston in a cylinder case. The piston is movable based on differential pressure in the chambers. A cylinder rod selectively extends and retracts in respect with the cylinder case to absorb a swinging motion of the axle. The passage is selectively open and closed based on at least one of a traveling state and a loading state of the vehicle. The piston has a first surface defining the first chamber and a second surface defining the second chamber. The first surface has an area equal to that of the second surface.

11 Claims, 2 Drawing Sheets

AXLE PIVOTING CONTROLLER AND HYDRAULIC CYLINDER FOR INDUSTRIAL VEHICLES

BACKGROUND OF THE INVENTION

The present invention relates to axle pivoting controllers and hydraulic cylinders for industrial vehicles.

A forklift is generally provided with a rear axle beam and a body frame. In order to improve the riding comfort and enhance the driving performance of the forklift, the center of the rear axle beam can be supported such that the rear axle beam is pivotal with respect to the body frame. The body frame and the rear axle beam are connected to each other by a hydraulic cylinder.

Japanese Unexamined Utility Model Publication No. 56-25609 describes a rear axle beam having ends that are each connected to a body frame by a single action hydraulic cylinder. Each hydraulic cylinder has a piston and an oil chamber. The oil chambers of the hydraulic cylinders are connected with each other by a passage. In accordance with the pivotal movement of the rear axle beam relative to the body frame, each piston is moved axially in its associated cylinder. Hydraulic oil flows between the oil chambers through the passage in accordance with the movement of each piston and restricts the pivotal movement of the rear axle beam.

When such a forklift carries a cargo, lifts a cargo to a high position, or changes directions at a high speed, the forklift becomes less stable. In order to increase the driving stability, the pivotal movement of the rear axle beam can be locked by restricting the movement of the pistons. An electromagnetic control valve is arranged in the passage to restrict the movement of the pistons by stopping the flow of hydraulic oil in the passage.

A forklift that restricts pivotal movements of the rear axle beam by employing two single action hydraulic cylinders requires a large number of components, which are installed on the forklift. In order to reduce the number of components, the owner of the present application has proposed to arrange a multiple action hydraulic cylinder on just one end of the rear axle beam to connect the rear axle beam with the body frame. The multiple action hydraulic cylinder has a piston, which defines a first oil chamber and a second oil chamber. The first and second oil chambers are connected with each other by a passage. The piston is moved axially in accordance with the pivotal movements of the rear axle beam. This moves the hydraulic oil between the first and second oil chambers and restrains the pivotal movement of the rear axle beam relative to the body frame. In this structure, the electromagnetic control valve restricts the movement of the piston by stopping the flow of the hydraulic oil in the passage between the first and second oil chambers. Thus, the pivotal movements of the rear axle beam are also restricted with this structure. In addition, this type of forklift employs only one cylinder. Therefore, the installation of the hydraulic cylinder is facilitated due to the smaller number of components.

However, in the multiple action hydraulic cylinder, one end of the piston is connected to a rod, which extends through one of the hydraulic oil chambers. Thus, the cross sectional area of this chamber, on which pressure is applied, is smaller than that of the other hydraulic oil chamber. Accordingly, the pressure applied to the piston differs when the piston moves in opposite directions. As a result, the velocity of the piston differs according to the moving direction. The difference in the velocity of the piston permits the forklift to tilt to the right and to the left in different manners such that the operator can feel the difference. In addition, the volume of oil that flows outward from one oil chamber is not the same as the volume of oil that enters the other oil chamber. It is thus necessary to eliminate the imbalance between the two oil volumes and permit the forklift to tilt to the right and to the left in the same manner.

SUMMARY OF THE INVENTION

Accordingly, it is an objective of the present invention to provide an axle pivoting controller for industrial vehicles that uses a reduced number of components to facilitate installation and that has a piston that always moves in the same manner regardless of the direction of movement.

To achieve the above objective, the present invention provides a hydraulic apparatus used in an industrial vehicle. The industrial vehicle has a hydraulic cylinder interposed between a vehicle frame and an axle swingably coupled to the frame. The hydraulic cylinder has a cylinder case and a piston movable in accordance with hydraulic pressure in the cylinder case. A cylinder rod selectively extends and retracts in respect with the cylinder case to absorb a swinging motion of the axle. A first chamber and a second chamber are defined by the piston in the cylinder case. The piston includes a first surface defining the first chamber and a second surface defining the second chamber. The first surface has a area equal to that of the second surface. A hydraulic passage connects the first chamber with the second chamber. The apparatus includes means for selectively opening and closing the hydraulic passage based on at least one of a traveling state and a loading state of the industrial vehicle.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

An axle pivoting controller according to the present invention, which is applied to a pivotal rear axle beam of a forklift, will now be described with reference to FIGS. 1 and 2.

Figure 1:
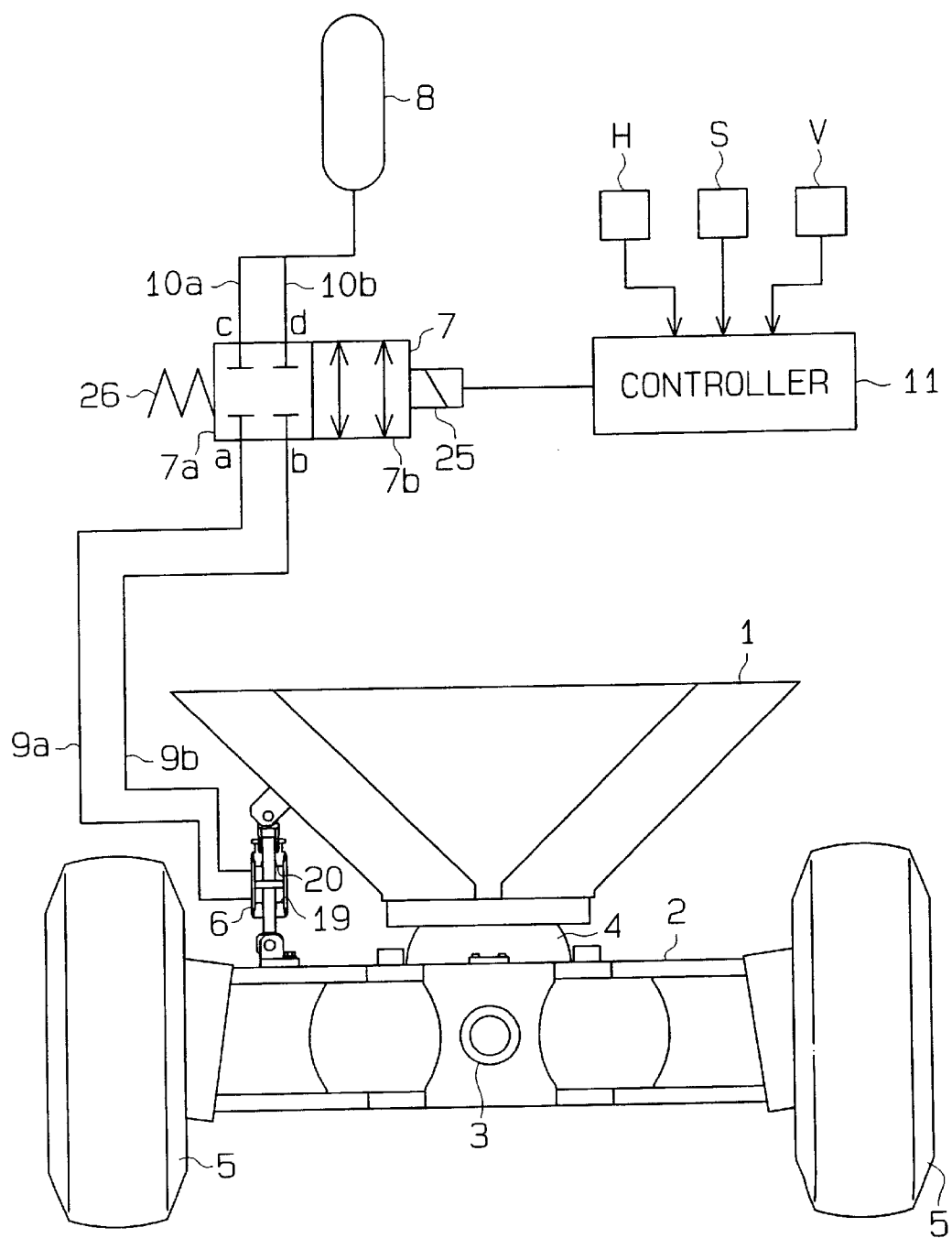
FIG. 1 is a schematic view showing a structure of an axle pivoting controller arranged on a rear axle beam.

FIG. 1 shows a schematic rear view of a forklift having a body frame 1 and a rear axle beam 2. The rear axle beam 2 is pivotally supported by a central pin 3, which is arranged in a lower portion of the body frame 1. A shock absorbing elastic body 4 is provided between the body frame 1 and the rear axle beam 2 to absorb shocks produced by the pivotal movement of the rear axle beam 2. A steered wheel 5 is mounted on each end of the rear axle beam 2 and supported such that the wheel 5 can be pivoted to steer the forklift.

A multiple action hydraulic cylinder 6 is arranged on one end of the rear axle beam 2. The hydraulic cylinder 6 connects the rear axle beam 2 to the body frame 1. An electromagnetic control valve 7 and an accumulator 8 are arranged on the body frame 1. The hydraulic cylinder 6 is connected to the electromagnetic control valve 7 and the accumulator 8 through passages 9a, 9b, 10a, 10b. Therefore, the passages 9a, 9b, 10a, 10b, the hydraulic cylinder 6, the electromagnetic control valve 7, and the accumulator 8 form a hydraulic circuit. An axle pivoting controller 11 is provided on the body frame 1.

Figure 2:
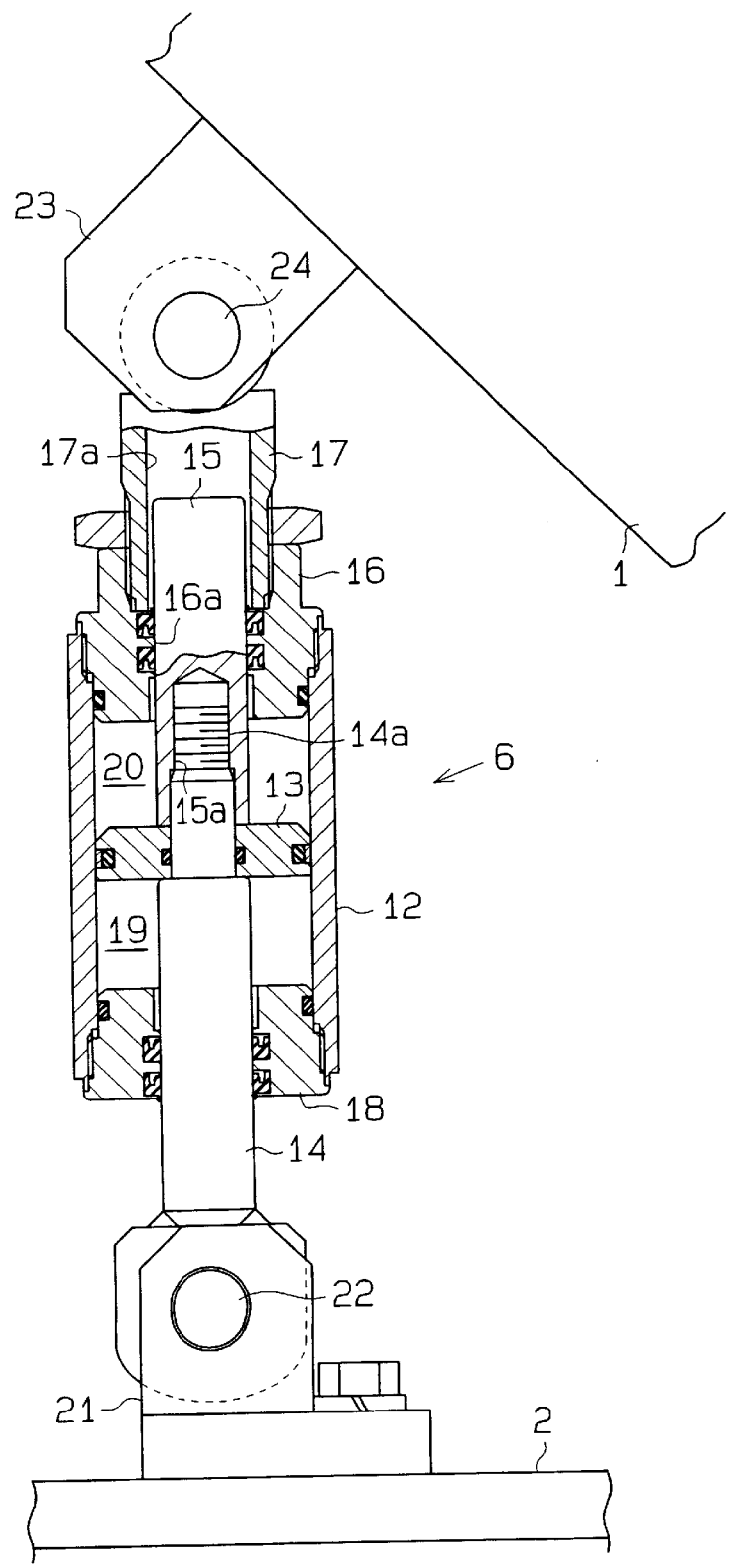
FIG. 2 is a cross sectional view showing a hydraulic cylinder.

FIG. 2 is a cross sectional view showing the hydraulic cylinder 6. The cylinder 6 includes a cylindrical tube 12, a piston 13, a piston rod 14, and a guide rod 15. The upper end of the piston 13 defines a head portion, and the lower end of the piston 13 defines a rod portion. The "upper" and "lower" directions referred to are taken from the upper and lower directions of FIG. 2. The upper end of the tube 12 is closed by a head piece 16 and a guide piece 17. The lower end of the tube 12 is closed by a rod piece 18. The piston 13 defines a rod chamber 19 and a head chamber 20 in the tube 12. The piston rod 14 extends through the rod chamber 19 and is fixed to the piston 13. The guide rod 15 extends through the head chamber 20 and is fixed to the piston 13. The piston rod 14 has a threaded male end 14a, which extends through the piston 13 and into the head chamber 20. The guide rod 15 has a threaded female end 15a, which engages the male end 14a. The other end of the piston rod 14 (the lower end) extends through the rod piece 18 and out of the tube 12. The other end of the guide rod 15 (the upper end) is slidably supported by a bearing 16a in the head piece 16 and is accommodated in a cavity 17a, which is defined in the guide piece 17. The threaded engagement between the male end 14a of the piston rod 14 and the female end 15a of the guide rod 15 forms a single integral rod. The piston 13 is located at the middle of the single rod. The cross sectional area of the guide rod 15 is equal to that of the piston rod 14. Therefore, the cross sectional area (or the piston area) that receives pressure is the same in the head side and in the rod side of the piston 13.

The lower end of the piston rod 14 is pivotally supported about a pin 22 on a bracket 21, which is fixed to the rear axle beam 2. The upper end of the guide piece 17 is pivotally supported about a pin 24 on a bracket 23, which is fixed to the body frame 1.

The electromagnetic control valve 7 has associated ports a, c, and associated ports b, d. The electromagnetic control valve 7 incorporates an electromagnetic solenoid 25, which shifts the control valve 7 between positions 7a and 7b. At position 7a, the electromagnetic control valve 7 disconnects port a from port c, and it disconnects port b from port d. At position 7b, the control valve 7 connects port a with port c, and port b with port d. A spring 26 is arranged in the control valve 7. When the electromagnetic solenoid 25 is de-excited, the control valve 7 is held at position 7a by the force of the spring 26. When the solenoid 25 is excited, the valve 7 is shifted to position 7b against the force of the spring 26. Therefore, the electromagnetic control valve 7 is normally closed. Port a is connected with the rod chamber 19 by way of the passage 9a. Port b is connected with the head chamber 20 by way of the passage 9b. Port c is connected with the accumulator 8 by way of the passage 10a. Port d is connected with the accumulator 8 by way of the passage 10b.

Therefore, when the electromagnetic control valve 7 is shifted to position 7a, the rod chamber 19 is disconnected from the head chamber 20. Thus, the hydraulic cylinder 6 restricts the pivotal movement of the rear axle beam 2 relative to the body frame 1 by stopping the flow of the hydraulic oil between the chambers 19, 20. On the other hand, when the control valve 7 is shifted to position 7b, the rod chamber 19 and the head chamber 20 are connected to each other by way of the passages 9a, 9b and the accumulator 8. The hydraulic cylinder 6 permits the pivotal movement of the rear axle beam 2 relative to the body frame 1 by permitting the hydraulic oil to flow between the chambers 19, 20. When the chambers 19, 20 are connected to each other, the hydraulic cylinder 6 restrains the pivotal movement of the rear axle beam 2 by the resistance generated as hydraulic oil passes through passages 9a and 9b.

When predetermined conditions are satisfied, the axle pivoting controller 11 excites the electromagnetic control valve 7. When the predetermined conditions are unsatisfied, the axle pivoting controller 11 de-excites the electromagnetic control valve 7 and restricts the pivotal movement of the rear axle beam 2. The predetermined conditions are unsatisfied when the height to which the cargo is lifted, the angle of the steered wheels 5, and the traveling speed of the vehicle exceed certain values. The height of the cargo is detected by a height sensor H. The angle of the wheels 5 is detected by a steering angle sensor S. The traveling speed of the vehicle is detected by a velocity sensor V.

The operation of the axle pivoting controller 11 and the hydraulic cylinder 6 will now be described.

When the controller 11 excites the electromagnetic control valve 7, the control valve 7 is shifted to position 7b and the head chamber 20 is communicated with the rod chamber 19. In this state, the hydraulic cylinder 6 is actuated and pivoting of the rear axle beam 2 relative to the body frame 1 is permitted in accordance with driving conditions. Therefore, pivoting of the rear axle beam 2 causes hydraulic oil to enter the rod chamber 19 or the head chamber 20 and move out of the rod chamber 19 or the head chamber 20.

When the rear axle beam 2 pivots clockwise relative to the body frame 1, as viewed in FIG. 1, the piston rod 14 retracts into the cylinder 6. The piston 13 thus moves toward the body frame 1 and receives pressure from the hydraulic oil in the head chamber 20. This restrains the axial movement of the piston rod 14 and the pivotal movement of the rear axle beam 2 relative to the body frame 1. As a result, the rear axle beam 2 pivots clockwise at an appropriate velocity.

If the rear axle beam 2 pivots counterclockwise relative to the body frame 1, the piston rod 14 projects from the cylinder 6. The piston 13 thus moves toward the rear axle beam 2 and receives pressure from the hydraulic oil in the rod chamber 19. This restrains the axial movement of the piston rod 14 and the pivotal movement of the rear axle beam 2 relative to the body frame 1. As a result, the rear axle beam 2 pivots counterclockwise at an appropriate velocity. Since the cross sectional area of the piston 13 is equal in the head chamber 20 and the rod chamber 19, the piston 13 receives the same pressure in the head chamber 20 and the rod chamber 19 when the piston 13 moves axially. Therefore, the retraction velocity of the piston 13 is equal to the projection velocity of the piston 13. As a result, the pivoting velocity of the rear axle beam 2 relative to the body frame 1 is the same when the rear axle beam 2 tilts clockwise and counterclockwise, as viewed in FIG. 2.

In addition, the volume of the hydraulic oil discharged from one of the oil chambers 19, 20 is the same as the volume of the hydraulic oil that enters the other oil chamber 19, 20.

The preferred and illustrated embodiment has the advantages described below.

(a) In the hydraulic cylinder 6 that connects the body frame 1 and the rear axle beam 2, the volume of the hydraulic oil that flows out of one of the oil chambers 19, 20, is equal to the volume of the hydraulic oil that flows into the other oil chamber 19, 20. As a result, the retraction velocity and the projection velocity of the piston 13 are the same. Thus, the hydraulic cylinder 6 operates in the same manner when the piston rod 14 retracts and projects. Accordingly, the forklift tilts to the right and to the left in the same manner.

The volume of the hydraulic oil that flows out of one of the oil chambers 19, 20, and the volume of the hydraulic oil that flows into the other oil chamber 19, 20, are the same. Therefore, it is not necessary to arrange a special structure to compensate for volume differences. As a result, the hydraulic circuit can be constructed in a simpler form.

(b) When the rear axle beam 2 pivots relative to the body frame 1, the clockwise pivoting velocity of the rear axle beam 2 is equal to the counterclockwise pivoting velocity of the rear axle beam 2, assuming the same amount of force is applied to each end of the rear axle beam 2.

(c) The electromagnetic valve 7 is normally closed. When the controller 11 malfunctions, the valve 7 cannot be controlled. Thus, the hydraulic oil does not flow between the passages 9a, 9b. In such case, the rear axle beam 2 is locked. This stabilizes the forklift even when carrying a cargo. Therefore, the transportation of the cargo can be completed before servicing the controller.

(d) The cross sectional area of the head side of the piston 13 and that of the rod side of the piston 13 are equal. Accordingly, the pressure applied to the piston 13 is the same when the piston rod 14 retracts and projects. Then, the velocity of the piston rod 14 is equal regardless of whether the piston rod 14 retracts or projects. As a result, the piston rod 14 operates in the same manner when it projects and retracts.

(e) The piston rod 14 and the guide rod 15 form a single rod by fastening the male end 14a of the piston rod 14 to the female end 15a of the guide rod 15. The piston 13 is located at the middle of the single rod. The piston rod 14, the guide rod 15, and the piston 13 are assembled by connecting the piston rod 14 and the guide rod 15. Thus, the rod is assembled with precision in a facilitated manner in comparison with the other assembling methods, such as welding.

It should be apparent to those skilled in the art that the present invention may be embodied in many other specific forms without departing from the spirit or scope of the invention. More particularly, the preferred and illustrated embodiment may be modified as described below.

The electromagnetic control valve 7 may be normally open. In this case, if the controller 11 malfunctions and the electromagnetic control valve 7 cannot be controlled, the rod chamber 19 and the head chamber 20 are connected. This permits pivoting of the rear axle beam 2. Therefore, the rear axle beam 2 is permitted to pivot, even if the controller 11 malfunctions. Accordingly, traction is maintained by all four wheels of the forklift and the ground as the forklift travels along unpaved roads. Thus, the forklift can be driven even if the road is unpaved before being serviced.

The piston rod 14 may be connected to the body frame 1 and the guide rod 15 may be connected to the rear axle beam 2. In other words, the cylinder 6 may be inverted from the orientation shown in FIG. 2.

The piston rod 14 and the guide rod 15 may be fixed to the piston 13 by welding, fasteners such as bolts, press fitting, and other appropriate means.

The cross sections of the piston rod 14 and the guide rod 15 do not have to be circular and may be polygonal.

The head piece 16 and the guide piece 17 may be fixed to each other in an integral manner.

Therefore, the present examples and embodiments are to be considered as illustrative and not restrictive and the invention is not to be limited to the details given herein, but may be modified within the scope and equivalence of the appended claims.

What is claimed is:

1. A hydraulic cylinder located between a frame of an industrial vehicle and an axle pivotally supported by the frame to regulate pivoting of the axle relative to the frame, comprising:

a cylinder case having a longitudinal axis, wherein the cylinder case includes a cylinder tube, a head piece, and a guide piece, the cylinder tube having a first end and an opposing second end, the head piece being attached to the second end and the guide piece being attached to the head piece;

a movable piston located in the cylinder tube to define a first hydraulic chamber and a second hydraulic chamber within the cylinder tube, wherein the piston has a first surface exposed to the first hydraulic chamber and a second surface exposed to the second hydraulic chamber, the first surface having an area that is equal to an area of the second surface, a piston rod projecting from the first surface, extending through the first hydraulic chamber, and protruding from the first end of the cylinder tube, the piston rod being connected to one of the axle and the frame and the guide piece being connected to the other of the axle and the frame; and a guide rod projecting from the second surface and extending through the second hydraulic chamber and into the interior of the guide piece, the piston rod having a cross-sectional area that is equal to a cross-sectional area of the guide rod.

2. The hydraulic cylinder according to claim 1, wherein a hydraulic passage connects the first hydraulic chamber to the second hydraulic chamber, movement of the piston rod is permitted when movement of a fluid between the first and the second hydraulic chambers is permitted, movement of the piston rod is prohibited when movement of the fluid between the first and the second hydraulic chambers is stopped, and pivoting of the axle is restricted when movement of the piston rod is prohibited.

3. The hydraulic cylinder according to claim 2, wherein a valve is located in the hydraulic passage for selectively permitting and prohibiting movement of the fluid between the first and the second hydraulic chambers.

4. The hydraulic cylinder according to claim 3, wherein the valve is an electromagnetic control valve that closes the hydraulic passage when the valve is deactivated.

5. The hydraulic cylinder according to claim 3, wherein an accumulator is located in the hydraulic passage.

6. A forklift comprising a frame, an axle pivotally supported by the frame, and a hydraulic cylinder located between the frame and the axle to regulate pivoting of the axle relative to the frame, wherein the hydraulic cylinder comprises:

a cylinder case having a longitudinal axis, wherein the cylinder case includes a cylinder tube, a head piece, and a guide piece, the cylinder tube having a first end and an opposing second end, the head piece being attached to the second end and the guide piece being attached to the head piece;

a movable piston located in the cylinder tube to define a first hydraulic chamber and a second hydraulic chamber within the cylinder tube, wherein the piston has a first surface exposed to the first hydraulic chamber and a second surface exposed to the second hydraulic chamber, the first surface having an area that is equal to an area of the second surface;

a piston rod projecting from the first surface, extending through the first hydraulic chamber, and protruding from the first end of the cylinder tube, the piston rod being connected to one of the axle and the frame and the guide piece being connected to the other of the axle and the frame; and a guide rod projecting from the second surface and extending through the second hydraulic chamber and into the interior of the guide piece, and the piston rod having a cross-sectional area that is equal to a cross-sectional area of the guide rod.

7. A hydraulic cylinder located between a frame of an industrial vehicle and an axle pivotally supported by the frame to regulate pivoting of the axle relative to the frame, comprising:

a cylinder case having a longitudinal axis, wherein the cylinder case includes a head piece, a guide piece, and a cylinder tube having a first end and an opposing second end, the head piece being attached to the second end of the cylinder tube and the guide piece being attached to the head piece;

a movable piston located in the cylinder tube to define a first hydraulic chamber and a second hydraulic chamber within the cylinder tube;

a piston rod projecting from the piston, extending through the first hydraulic chamber, and protruding from the first end of the cylinder tube, the piston rod being connected to one of the axle and the frame and the guide piece being connected to the other of the axle and the frame; and a guide rod projecting from the piston and extending through the second hydraulic chamber, the guide rod being slidably supported by the head piece and accommodated within the interior of the guide piece.

8. The hydraulic cylinder according to claim 7, wherein the piston rod has a cross-sectional area that is equal to a cross-sectional area of the guide rod.

9. The hydraulic cylinder according to claim 7, wherein a hydraulic passage connects the first hydraulic chamber to the second hydraulic chamber, movement of the piston rod is permitted when movement of a fluid between the first and the second hydraulic chambers is permitted, movement of the piston rod is prohibited when movement of the fluid between the first and the second hydraulic chambers is stopped, and pivoting of the axle is restricted when movement of the piston rod is prohibited.

10. The hydraulic cylinder according to claim 9, wherein a valve is located in the hydraulic passage for selectively permitting and prohibiting movement of the fluid between the first and the second hydraulic chambers.

11. The hydraulic cylinder according to claim 10, wherein the valve is an electromagnetic control valve that closes the hydraulic passage when the valve is deactivated.

* * * * *